United States Patent
Schat (10) Patent No.: US 11,411,749 B2
(45) Date of Patent: Aug. 9, 2022

(54) SYSTEM AND METHOD FOR PERFORMING NETLIST OBFUSCATION FOR A SEMICONDUCTOR DEVICE

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 324 days.

(21) Appl. No.: 16/778,442

(22) Filed: Jan. 31, 2020

(65) Prior Publication Data

US 2021/0243041 A1 Aug. 5, 2021

(51) Int. Cl.
| H04L 29/06 | (2006.01) |
| H04L 9/32 | (2006.01) |
| H03K 3/037 | (2006.01) |
| H03K 19/003 | (2006.01) |
| G06F 21/74 | (2013.01) |

(52) U.S. Cl.
CPC ............ *H04L 9/3278* (2013.01); *G06F 21/74* (2013.01); *H03K 3/037* (2013.01); *H03K 19/003* (2013.01)

(58) Field of Classification Search
CPC ... H04L 9/3278; G06F 21/74; G06F 21/6254; H03K 3/037; H03K 19/003
See application file for complete search history.

(56) References Cited

U.S. PATENT DOCUMENTS

| 8,572,543 | B2 | 10/2013 | Dirks et al. |
| 9,729,324 | B2 | 8/2017 | Yamamoto et al. |
| 10,200,191 | B2* | 2/2019 | Marin ............ H04L 9/002 |
| 2014/0093074 | A1* | 4/2014 | Gotze ............ G06F 21/73 380/45 |
| 2018/0004444 | A1* | 1/2018 | Murray .......... G06F 3/0622 |
| 2018/0151506 | A1* | 5/2018 | Tammanur Ranganathan ............ H01L 23/544 |
| 2018/0277496 | A1* | 9/2018 | Lisart ............ H01L 23/576 |

OTHER PUBLICATIONS

Vatajelu et al., "Towards a highly reliable SRAM-based PUFs", 2016 Design, Automation & Test in Europe Conference & Exhibition (DATE), Date of Conference: Mar. 14-18, 2016.*
Helfmeier, C., et al. "Cloning Physically Unclonable Functions", 2013 IEEE International Symposium on Hardware-Oriented Security and Trust (HOST), pp. 1-6. (Aug. 16, 2013).
Khaleghi, S., et al. "Hardware Obfuscation Using Strong PUFs", 2018 IEEE Computer Society Annual Symposium on VLSI (ISVLSI), pp. 321-326. (Aug. 9, 2018).
Maes, R., et al. "Countering the effects of Silicon Aging on SRAM PUFs", 2014 IEEE International Symposium on Hardware-Oriented Security and Trust (HOST), pp. 148-153. (Jul. 17, 2014).

(Continued)

*Primary Examiner* — Morshed Mehedi (57) ABSTRACT

A tie cell includes a first flip-flop having a physically unclonable function (PUF), a second flip-flop that generates a PUF key value, and logic that logically combines the PUF value and the PUF key value to generate an output signal having a constant logical value. The PUF value is based on a power-up value stored in the first flip-flop, which power-up value is generated based on physical and/or electrical characteristics produced from a manufacturing process. The output value is generated to tie digital logic to the constant logical value.

14 Claims, 6 Drawing Sheets

(56) References Cited

OTHER PUBLICATIONS

Mathew, S. K., et al. "A 0.19pJ/b PVT-Variation-Tolerant Hybrid Physically Unclonable Function Circuit for 100% Stable Secure Key Generation in 22nm CMOS", 2014 IEEE International Solid-State Circuits Conference, pp. 278-279. (Mar. 6, 2014).
Mobaraki, S., et al. "A Novel PUF based Logic Encryption Technique to Prevent SAT Attacks and Trojan Insertion", 2018 9th International Symposium on Telecommunications (IST), p. 507-513. (Mar. 7, 2019).
Tajik, S., et al. "Laser Fault Attack on Physically Unclonable Functions", 2015 Workshop on Fault Diagnosis and Tolerance in Cryptography, pp. 85-96. (Mar. 7, 2016).
Tajik,, S., et al. "Physical Characterization of Arbiter PUFs", Cryptographic Hardware and Embedded Systems, CHES 2014, pp. 493-509 Springer (2014).
Vermeulen, B., et al. "Test and Debug Strategy of the PNX8525 NexperiaTM Digital Video Platform System Chip", International Test Conference 2001, paper 5.2, pp. 121-130. (Aug. 7, 2002).
Vijayakumar, A., et al. "Physical Design Obfuscation of Hardware: A Comprehensive Investigation of Device and Logic-Level Techniques", IEEE Transactions on Information Forensics and Security, vol. 12, No. 1, dd. 64-77. (Jan. 2017).
Wendt, James B., et al. "Hardware obfuscation using PUF-based logic", 2014 IEEE/ACM International Conference on Computer-Aided Design (ICCAD), p. 270-277. (Jan. 8, 2015).
Zhang, J., et al. "A Practical Logic Obfuscation Technique for Hardware Security", IEEE Transactions on very large Scale Integration (VLSI) Systems, vol. 24, No. 3, pp. 1193-1197. (Mar. 2016).

\* cited by examiner

SYSTEM AND METHOD FOR PERFORMING NETLIST OBFUSCATION FOR A SEMICONDUCTOR DEVICE

Example embodiments herein relate generally to security measures for semiconductor devices.

BACKGROUND

Preventing hackers from obtaining unauthorized access to integrated circuit (IC) chips is a focus of system designers. One hacking technique involves attempting to reverse engineer the netlist of a chip. A netlist indicates the logical and/or physical connectivity of the components of the electronic circuits on a chip, which connectivity may be indicated, for example, in terms of instances, nodes, connection points, wires, and attributes of the circuit components. Once access is achieved, a hacker may attempt to copy the IC for purposes of stealing proprietary secrets or selling counterfeit chips. Other hackers may install trojans or backdoors on the chip or find existing backdoors on the chip for accessing software stored therein. Existing methods for protecting integrated circuit chips from these kinds of attacks have proven to have significant drawbacks.

SUMMARY

In accordance with one or more embodiments, a tie cell includes a first flip-flop including a physically unclonable function (PUF), a second flip-flop configured to generate a PUF key value, and logic configured to combine a value of the PUF and the PUF key value to generate an output signal having a constant logical value, wherein the PUF value is based on a power-up value stored in the first flip-flop, the power-up value generated as a result of physical and/or electrical characteristics produced from a manufacturing process, and wherein the output value is generated to tie digital logic to the constant logical value.

The tie cell may include a selector coupled to an input of the second flip-flop, wherein the selector is configured to select: in a first mode, a first signal based on the PUF value output from the first flip-flop, and in a second mode, a second signal based on the PUF key value. The first mode may be a scan test capture mode to provide notification of the PUF value; and the second mode may be a scan test mode to determine existence of a fault in the tie cell. The second flip-flop may store the PUF value in the scan test capture mode. The second flip-flop may store and then shift the PUF key value to the logic in the scan test mode. The logic may include XOR logic. The PUF key value may be equal to the PUF value when the constant logical value is zero, and different from the PUF value when the constant logical value is one.

In accordance with one or more embodiments, an integrated circuit includes a first tie cell configured to generate a first signal, a second tie cell configured to generate a second signal, and a controller configured to generate at least one control signal for one or both of the first tie cell and the second tie cell, wherein the first tie cell embodies a first physically unclonable function (PUF) and the second tie cell includes a second PUF different from the first PUF and wherein the first signal has a constant first logical value and the second signal has a constant second logical value different from the first logical value.

The controller may generate the at least one control signal to activate the first tie cell during a time when the second tie cell is inactive. The first tie cell may include a first flip-flop including the first PUF, a second flip-flop configured to generate a PUF key value, and logic configured to combine a value of the PUF and the PUF key value to generate an output signal having a constant logical value, wherein the PUF value is based on a power-up value stored in the first flip-flop. The power-up value may be generated as a result of physical and/or electrical characteristics produced from a manufacturing process, and the output value may be generated to tie digital logic to the constant logical value.

The integrated circuit may include a selector coupled to an input of the second flip-flop, wherein the selector may select, in a first mode, a first signal based on the PUF value output from the first flip-flop and, in a second mode, a second signal based on the PUF key value. The first mode may be a scan test capture mode to provide notification of the PUF value and the second mode may be a scan test mode to determine existence of a fault in the tie cell. The second flip-flop may store the PUF value in the scan test capture mode. The second flip-flop may store and then shift the PUF key value to the logic in the scan test mode. The logic may include XOR logic. The PUF key value may be equal to the PUF value when the constant logical value is zero and be different from the PUF value when the constant logical value is one.

In accordance with one or more embodiments, a method for controlling an integrated circuit includes obtaining a value correspond to a physically unclonable function (PUF), generating a PUF key value based on the PUF value, and logically combining the PUF value and the PUF key value to generate an output signal having a constant logical value, wherein the PUF value is based on a power-up value stored in a first flip-flop in a tie cell, the power-up value generated as a result of physical and/or electrical characteristics produced from a manufacturing process, and wherein the output value is generated to tie digital logic to the constant logical value.

The method may include selecting a signal for input into a second flip-flop in the tie cell, wherein the signal is based on the PUF value output from the first flop-flop in a first mode and the signal is based on the PUF key value in a second mode. The PUF value and the PUF key value may be logically combined by XOR logic. The PUF key value may equal to the PUF value when the constant logical value is zero and be different from the PUF value when the constant logical value is one.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Figure 1:
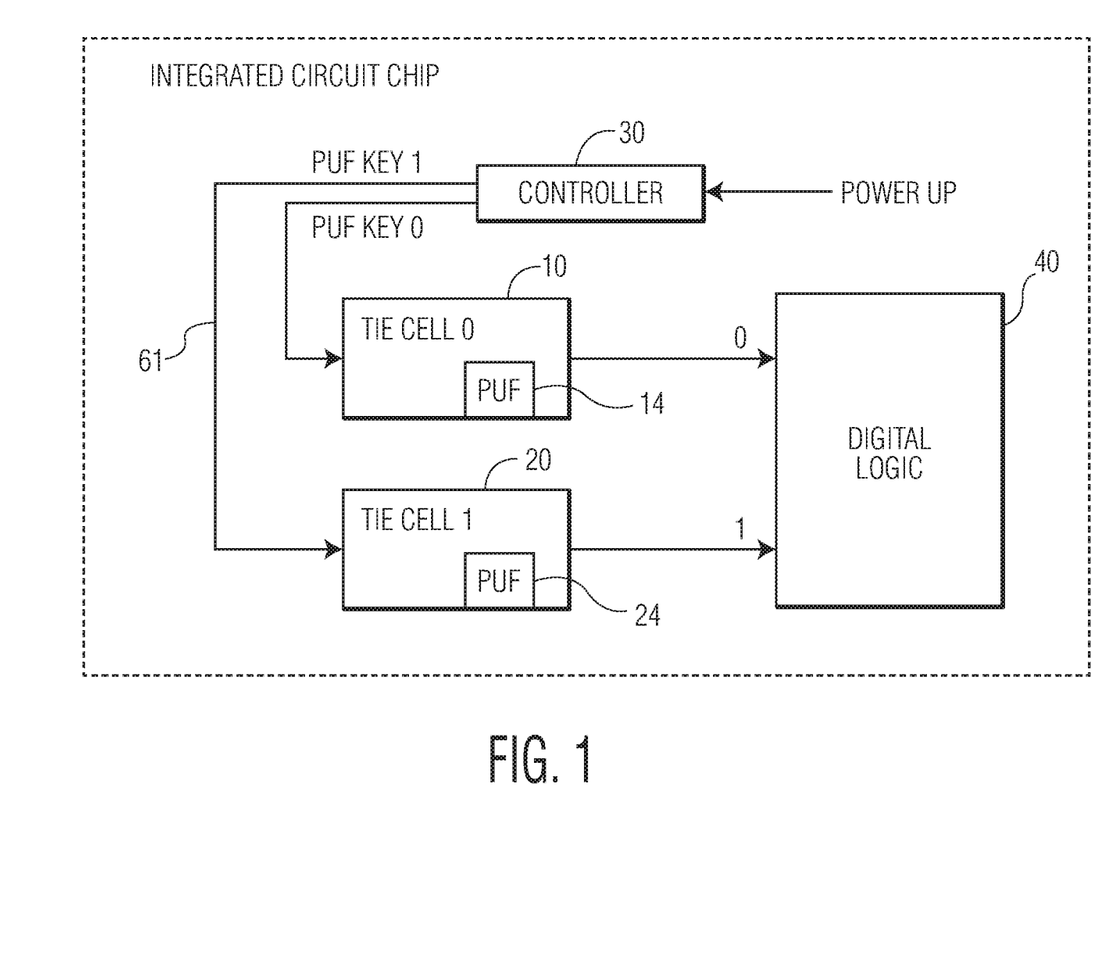
FIG. 1 illustrates an embodiment of a system for implementing netlist obfuscation.

FIG. 1 illustrates an embodiment of a system for implementing netlist obfuscation for a semiconductor device, such as but not limited to an integrated circuit chip. The system performs network obfuscation using one or more tie cells interspersed throughout the logic of the chip. Tie cells output a constant logical value and are normally reserved for use in the intended applications of integrated circuit chips. This embodiment also uses tie cells to perform circuit obfuscation, which is an approach which heretofore has not been implemented.

Referring to FIG. 1, the system includes a first tie cell (Tie Cell 0) 10, a second tie cell (Tie Cell 1) 20, and a controller 30. The tie cell 10 generates a first constant logical value (e.g., logical zero), and the tie cell 20 generates a second constant logical value (e.g., logical one). The tie cells operate in a security mode and an application mode of the chip. In application mode, the tie cells generate their respective constant logical values in order to hold (or tie) the input(s) of other logic on the chip, which, for example, may include digital logic 40. Input(s) of the digital logic 40 may be tied, for example, in order to ensure that none of the components of this logic is in a floating or otherwise unstable state during application mode. In security mode, the tie cells generate their respective constant logical values in order to obfuscate the netlist of the chip in accordance with the embodiments described herein.

Tie cell 10 includes logic 14 that corresponds to a first physically unclonable function (PUF). A physically unclonable function (PUF) is a digital fingerprint that may be used to identify a semiconductor device. The fingerprint is generated based on physical and/or electrical characteristics of the device, which, for example, may be based on variations in feature dimensions and/or doping concentrations that occur during the manufacturing process. Because the variations are uncontrollable (even by the fabricator), the resulting characteristics may be detected in order to form a digital fingerprint that uniquely identifies the device. In this way, the device fingerprints may be considered to be unclonable.

In one embodiment, the logic 14 may include a first flip-flop that generates the first PUF for tie cell 10. The first PUF may correspond to a power-up value that is loaded into the first flip-flop each time the device is powered on. The power-up value is a logical one or a logical zero that may result from the variations of the chip mentioned above. These variations may cause the same logical value to be stored in the flip-flop for each power-up operation, and thus may be relied on, alone or with one or more other PUFs, to uniquely identify the chip. The logical value generated by the first flip-flop in logic 14 is known to the manufacturer and may be acquired, for example, through testing and kept secret in order to preserve the security of the chip.

In operation, the tie cell 10 generates a constant logical zero value based on first PUF key 51 and a logical value corresponding to the first PUF, which may be a logical one or a logical zero as previously described. Once the logical value (power-up value) corresponding to the first PUF is known to the IC manufacturer, the logical value of the first PUF key 51 may be determined. The logical value of the first PUF key may be a one-bit logical value which, when logically combined with the first PUF value, produces the constant output value of the tie cell 10, which in this case is a logical zero.

Tie cell 20 includes logic 24 that corresponds to a second physically unclonable function (PUF). The logical value of the second PUF is determined based on the physical and/or electrical characteristics of the IC, as previously described. Because the logical value of the second PUF is determined in this manner, it may be the same or different from the logical value of the first PUF.

In one embodiment, the logic 24 may include a second flip-flop that generates the second PUF for tie cell 20. The second PUF may correspond to a power-up value that is loaded into the second flip-flop each time the chip is powered on. The power-up value is a logical one or a logical zero that may result from the variations of the chip mentioned above. These variations may cause the same logical value to be stored in the second flip-flop for each power-up operation, and thus may be relied on, alone or with one or more other PUFs, to uniquely identify the chip. The logical value generated by the second flip-flop in logic 24 is known to the manufacturer and may be acquired, for example, through testing and kept secret in order to preserve the security of the chip.

In operation, the tie cell 20 generates a constant logical one value based on second PUF key 61 and the logical value (power-up value) corresponding to the second PUF, which may be a logical one or a logical zero as previously described. Once the logical value corresponding to the second PUF is known to the IC manufacturer, the logical value of the second PUF key 61 may be determined. The logical value of the second PUF key may be a one-bit logical value which, when logically combined with the second PUF value, produces the constant output value of the tie cell 20, which in this case is a logical one.

The controller 30 generates the first and second PUF keys 51 and 61 that are input into respective ones of the tie cells. The controller may also generate one or more control signals for the tie cells, including but not limited to clock signals for the flip-flops, enable signals for the flip-flops and/or other tie cell logic, scan test signals, and/or selection signals. In security mode, only one of the two tie cells may be selected to be active; the other tie cell may be inactive. The active tie cell may be selected by a selection signal generated by controller 30, which, for example, may correspond to the PUF key of the tie cell that is to be active. In this case, the controller 30 may output a signal having a logical value opposite to the PUF key of the other tie cell that is to be inactive. In another embodiment, the selection signal of the tie cell to be active may be different from the PUF key signal.

In one embodiment, only one of the tie cells may be active during application mode. For example, one or more logic gates (e.g., AND gates, OR gates, etc.) in digital logic 40 may be tied to at a logical one value or a logical zero value for certain operations in application mode, in order to prevent a floating state condition from occurring in the digital logic 40. Conversely, NMOS transistors in digital logic 40 may be clamped at a logical zero value for certain operations in application mode, in order to prevent a floating state of the NMOS transistors. If only one of the tie cells 10 or 20 is to be active in application mode, then the PUF key for that tie cell may select that cell to be active. In some embodiments, both tie cells may be active in application mode.

Inserting the PUF logic into respective ones of the tie cells makes it more difficult to discover the PUFs through hacking techniques. For example, by inserting the PUF logic in one or more of the tie cells and by implementing the operations of the embodiments described herein, attempts to determine the netlist of the chip through reverse engineering, analysis of the chip layout, or through examination of the register transfer level (RTL) code is made more difficult or prevented. In FIG. 1, the tie cells are illustrated to be separate from the digital logic 40. In another embodiment, the tie cells may be integrated among logic gates in digital logic 40 as individual tie cells, or a plurality of tie cell pairs 10 and 20 may be distributed over or integrated within logic gates in the digital logic. Integrating or distributing the tie cells in the digital logic may increase the difficulty of detecting the tie cells, thus introducing an additional measure of security for the chip.

Figure 2:
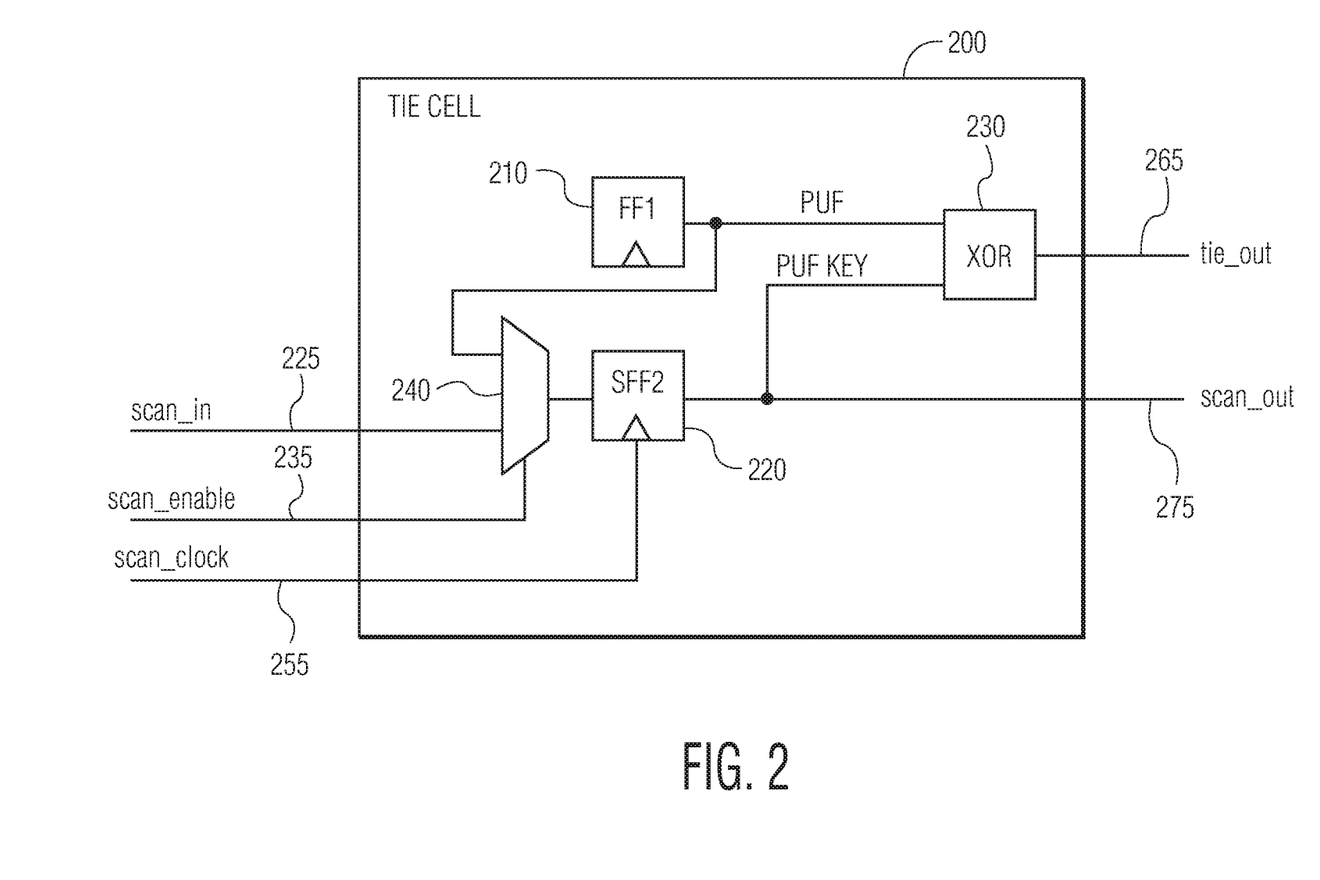
FIG. 2 illustrates an embodiment of a tie cell.

FIG. 2 illustrates an embodiment of a tie cell which may be representative of each of the tie cells 10 and 20 in the embodiment of FIG. 1. The tie cell 200 of FIG. 2 is a scan-testable cell used for circuit obfuscation, which cell is a first flip-flop 210, a second flip-flop 220, and logic 230. The first flip-flop (FF1) 210 stores a power-up value that corresponds to a physically unclonable function of the chip. As previously indicated, the logical value of the power-up value is determined by the unique physical and/or electrical characteristics of the chip produced during manufacture. The power-up value may be stored in the first flip-flop when the chip is powered on and before an operation is performed to reset the flip-flop 210. The flip-flop may be enabled by a signal from the controller.

The second flip-flop (SFF2) corresponds to logic that generates the PUF key for the tie cell. As previously indicated, in accordance with one embodiment the PUF key may be a one-bit logical value which, when logically combined with the logical value of the PUF, generates the constant logical output of the tie cell.

After power up, the chip controller 30 may perform a scan test of the logic in the chip or may perform a predetermined mode or operation for the chip logic. This involve logically connecting multiple portions of the chip in one or more scan chains and then shifting signals (e.g., logical values) through the scan chain(s) to detect various faults, e.g., a stuck-at-0 fault in a tie-0 cell. Such a fault may arise based on voltages differences between the ground of the tie cell and the ground of that a fault connects to. This voltage difference may allow current to flow through a defective part, which consequently may cause the fault to worsen over time. A scan test performed, for example, after power-up, may detect such faults. In accordance with one embodiment, a scan test may be modified to perform netlist obfuscation in accordance with embodiments described herein.

In one embodiment, the scan test may involve inputting a scan_in signal 225 into the tie cell. The scan_in signal may include the one-bit logical value corresponding to the PUF key. As previously indicated, the value of the PUF key is determined once the logical value of the PUF is known, which, for example, may be determined by the chip manufacturer during a production test. The scan_in signal may be accompanied by a scan_enable signal 235 also output from the controller. The scan_enable signal may serve as a selection signal for a multiplexer 240, to select the scan_in signal 225 during the scan test. Selecting the scan_in signal shifts the PUF key into the second flip-flop. A scan_clock signal 255 is then applied by a clock signal generator (or the controller) to shift the PUF key into logic 230. In one embodiment, the scan_clock signal 255 may be input into the first flip-flop to shift the PUF out to logic 230.

Logic 230 generates a tie_out signal 265 which corresponds to the constant logical output value of the tie cell. This tie_out signal is generated based on a logical combination of the PUF value and the PUF key value. In this embodiment, the logic 230 includes an XOR gate which generates a constant output tie value corresponding to one of the entries in Table 1. The constant tie value may then be input into the digital logic 40. Logic 230 may have a different logical construction (e.g., may include one or more logic gates in addition to or in place of the XOR gate).

| PUF | PUF Key | Logic | Tie Cell Output |
| --- | --- | --- | --- |
| 0 | 0 | XOR | 0 |
| 1 | 1 | XOR | 0 |
| 0 | 1 | XOR | 1 |
| 1 | 0 | XOR | 1 |

In addition to the foregoing features, the second flip-flop generates a scan_out signal 275, which may have one of two values. When the multiplexer 240 selects the scan_in signal 225, the scan_out signal 275 may correspond to the scan_in signal, which in this case may correspond to the logical value of the PUF key. When the multiplexer selects the PUF output from the first flip flop, the scan_out signal 275 may correspond to the PUF value. Controlling the multiplexer to select the PUF value may therefore be implemented during a production test, in order to allow the manufacturer to determine the logical value of the PUF of the first flip-flop and thus the appropriate value of the PUF key, e.g., by combining the determined PUF value with a logical value (key) that produces the intended constant-value output of the tie cell. Because the controller knows the specific type of logic in the tie cell, the key may be determined.

Figure 3A:
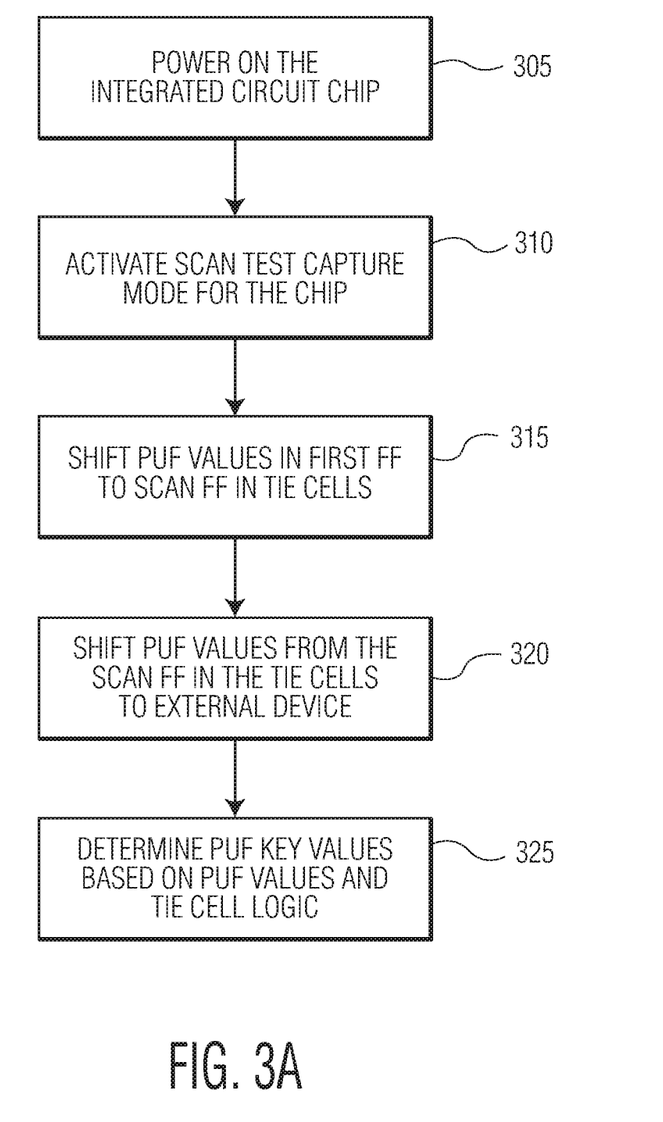
FIGS. 3A and 3B illustrate operations included in a method for netlist obfuscation.
Figure 3B:
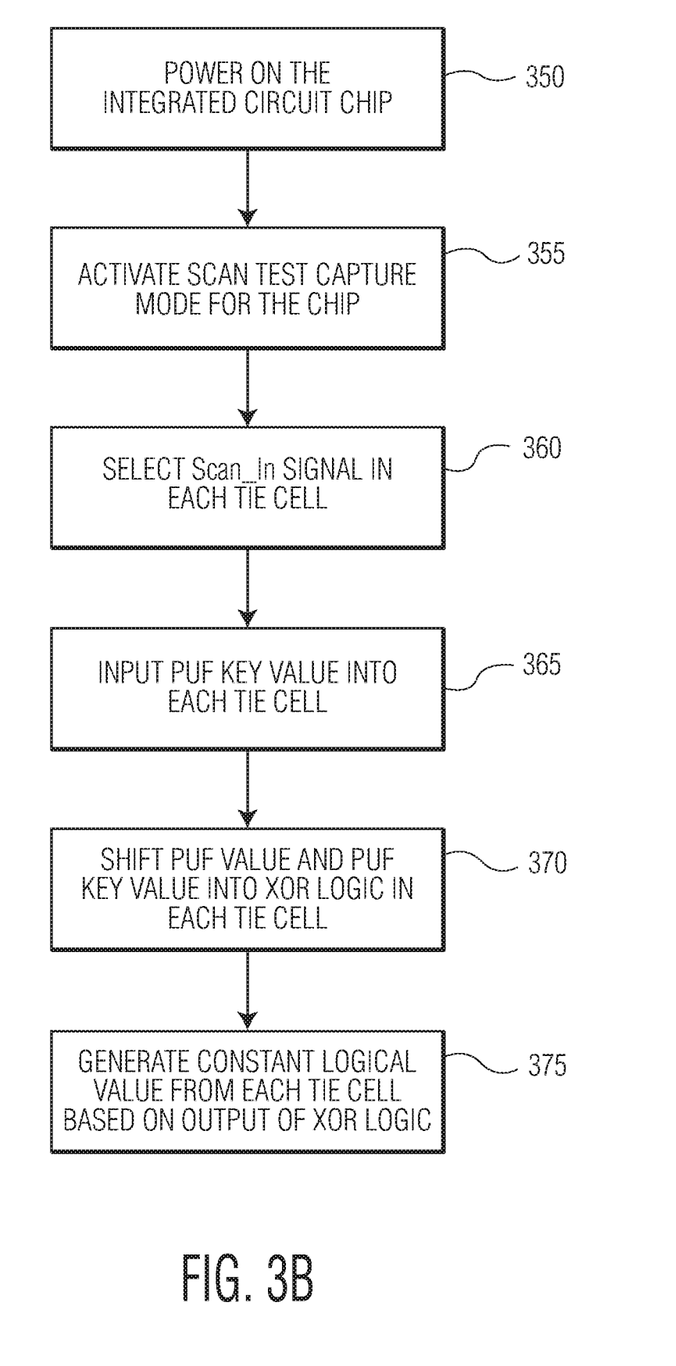

FIGS. 3A and 3B illustrate an embodiment of a method for implementing netlist obfuscation for a semiconductor device, e.g., an integrated circuit chip. The method may be performed in accordance with any of the system, apparatus, tie cell, and/or other embodiments described herein. For illustrative purposes, the method will be described in association with the embodiments of FIGS. 1 and 2.

Referring to FIG. 3A, at 305, an initial operation includes powering on the chip. This causes a power-up signal to be input into the chip controller 30. At 310, the chip controller enters a scan test capture mode to determine the PUF values of the tie cells 10 and 20 containing respective PUFs. This operation may involve outputting a scan-enable signal 235 to the multiplexer 240 in each tie cell, in order to select the PUF input from the first flip-flops in each of the tie cells. At 315, a clock signal is used to shift the PUF value from the first flip-flops in each tie cell to the second, scan flip-flop in those cells. At 320, a scan_clock signal 255 is applied to shift the PUF values from the second flip-flops in the tie cells to an external production tester or other system of the manufacturer. Thus, the PUF values of the tie cells 10 and 20 become known to the manufacturer. At 325, the manufacturer determines the PUF key values for tie cells 10 and 20 based on the logical values of their PUFs and a knowledge of the logic in the tie cell that is coupled to the outputs of the first and second flip-flops.

Referring to FIG. 3B, once the PUF values and PUF key values are known for the tie cells, the integrated circuit chip may be used for its intended application. In such a case, the method may further include, at 350, powering on the chip. This causes the power-up signal to be input into the chip controller 30. At 355, the chip controller enters a scan test mode which may involve, for example, logically concatenating logic (e.g., flip-flops) in the chip into one or more scan chains and applying test signals to detect faults. These faults may include, for example, one or more tie cells outputting a wrong logical value, e.g., a tie-0 cell outputting a logical 1 or a tie-1 cell outputting a logical zero.

At 360, the controller 30 may generate a scan_enable signal 235 that is to be input into each of the tie cells 10 and 20. The scan_enable signal causes the multiplexer 240 in each of the tie cells to select the scan_in signal 225. At 365, the controller 30 may input the PUF key value (as previously determined) into the scan flip-flop 220 of each tie cell. At 370, the controller generates a scan_clock signal 255 to cause the second (scan) flip-flop to shift the PUF key value to the XOR logic 230 in each tie cell. This same signal or a different control signal may cause the first flip-flop in each cell to shift its PUF value to the XOR logic. At 375, the XOR logic in each tie cell logically combines its associated PUF and PUF key values to generate the constant logic output, e.g., logical zero in the case of tie cell 10 and logical one in the case of tie cell 20.

A number of additional features or embodiments may also be provided as described herein. For example, as previously described, netlist obfuscation may be performed based on scan test signals. In one embodiment, access to the scan test function of the chip may be secured so that only the IC manufacturer is able to execute the scan test. In addition, or as an alternative, to this approach, and in accordance with one embodiment the chip may be designed to prevent a direct connection between the first flip-flop (which outputs the PUF) and the second (scan) flip-flop.

Figure 4:
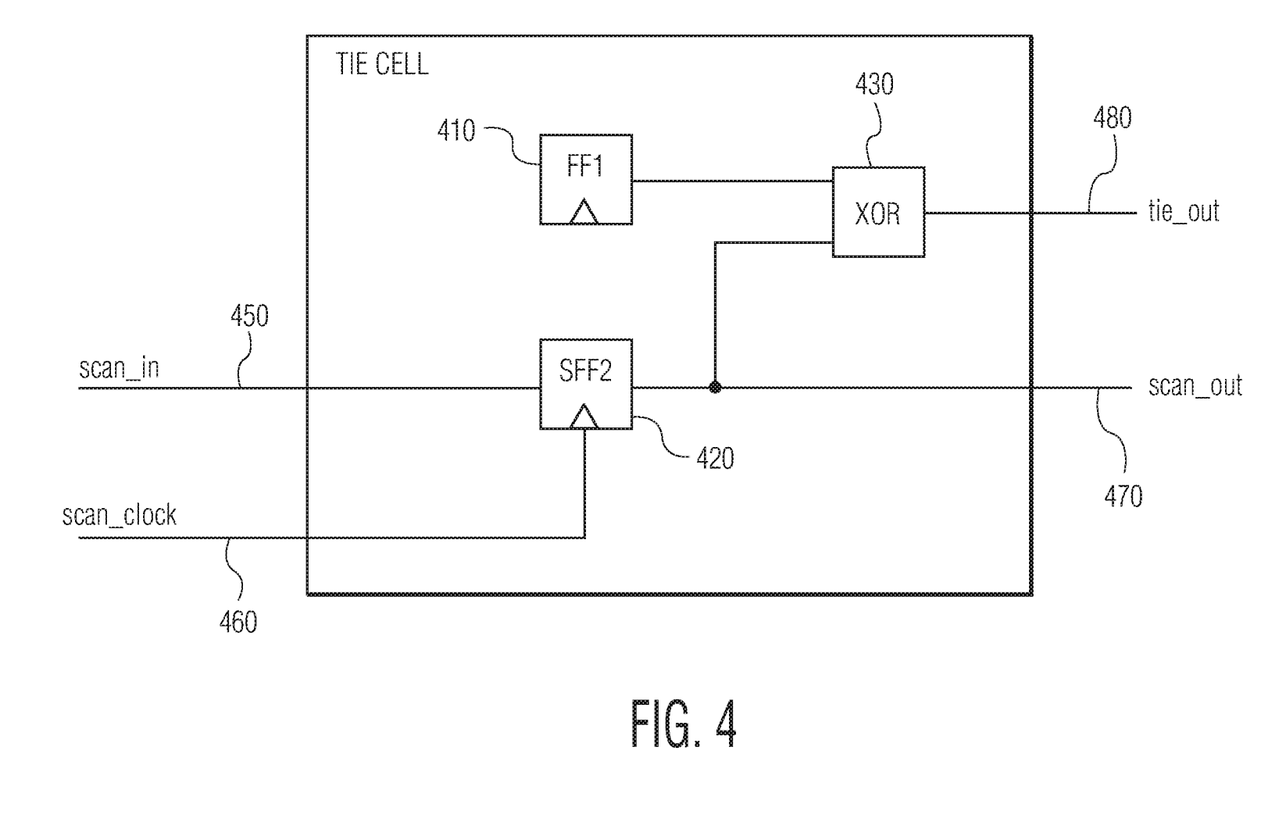
FIG. 4 illustrates another embodiment of a tie cell.

FIG. 4 illustrates another embodiment of a tie cell with secured (e.g., restricting) access to the chip scan test. This tie cell may serve as either or both of the tie cells of FIG. 1.

Referring to FIG. 4, in this embodiment the tie cell includes a first flip-flop 410 for generating the PUF, a second flip-flop 420 for generating the PUF key, and XOR logic 430 for generating a tie_out signal 440 corresponding to the constant logic output of the tie cell. In this case, the first flip-flop 410 may be controlled, for example, by an enable or clock signal. The second flip-flop 420 receives a scan_in signal 450 corresponding to the logical value of the PUF key and a scan_clock signal 460 that shifts the PUF key into the XOR logic 430, where it is logically combined with the PUF value to generate the tie_out signal 480. The first flip-flop may shift its PUF value into logic 430 based on the enable signal or clock signal, which may or may not be independent from the scan_clock signal 460. The PUF key value also corresponds to the scan_out signal 470 generated from the tie cell during the scan test.

However, unlike some other embodiments, this embodiment of the tie cell is designed so that no connection (direct or indirect) exists between the first and second flip-flops 410 and 420. The lack of a connection between these tie-cell flip-flops increases the difficulty of an attacker obtaining the netlist of the chip, as well as the ability to clone the chip. Even though there is no connection between flip-flops 410 and 420, performance of the scan test is still possible. For example, it is still possible to run a scan test with different PUF_KFY values shifted in. Only the correct values of PUF_KFY will lead to a passing scan test. Hence, by varying the possible PUF_KFY values, the chip manufacturer will be able to find the one combination of PUF_KFY values that make the scan test pass, and hence match the chip PUF values, which may be used to program the IC chip.

Figure 5:
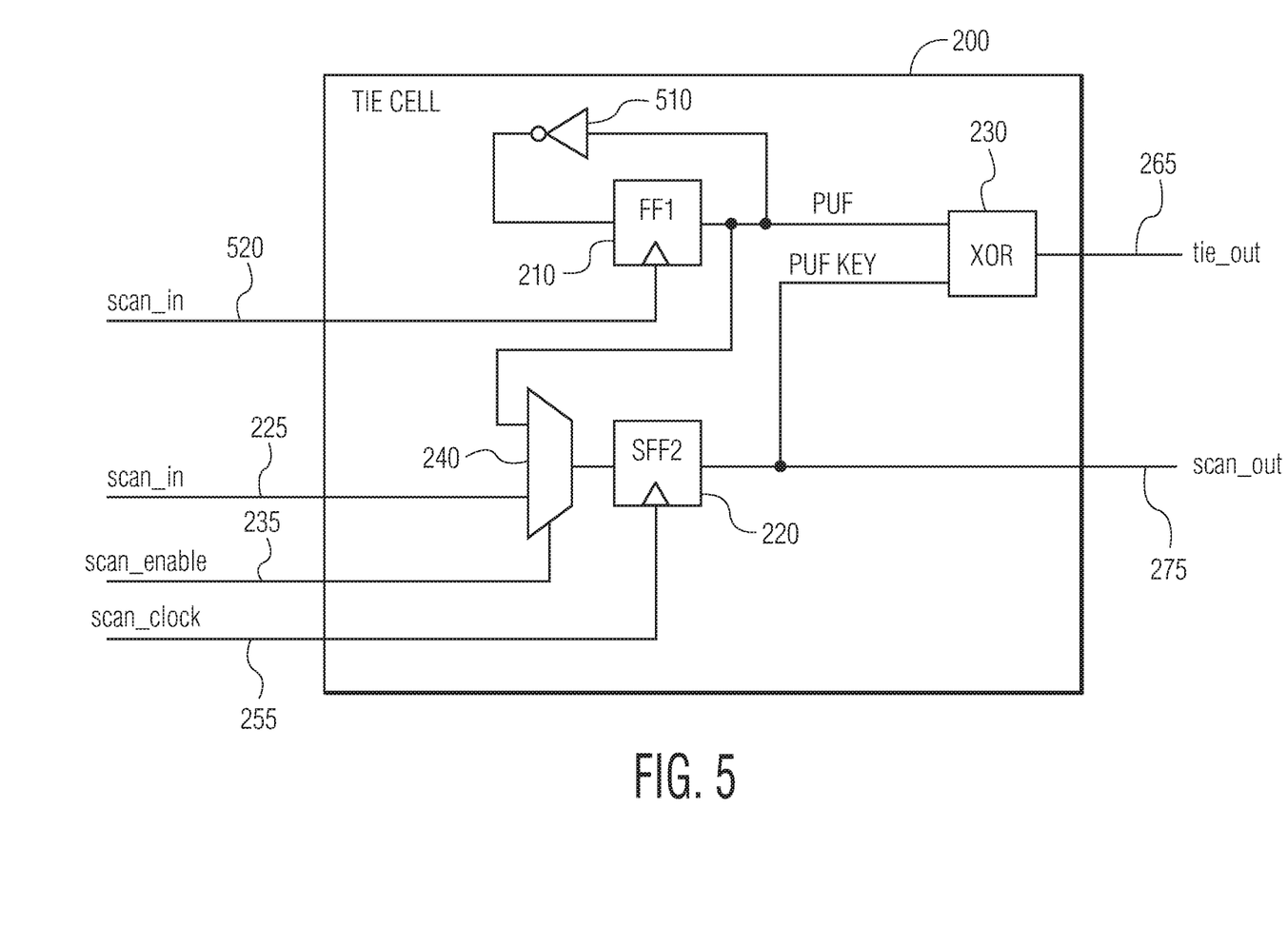
FIG. 5 illustrates another embodiment of a tie cell.

FIG. 5 illustrates another embodiment of a tie cell with bias temperature instability (BTI) compensation. This embodiment may correspond to the tie cell of FIG. 2, except that it has been modified to include an inverter 510 and to receive a reset signal 520. In operation, inverter 510 inverts the power-up state of the first flip-flop 210 along a feedback path that leads back into the data input of the first flip-flop 210. The inverted PUF value is maintained in the first flip-flop for a predetermined time, e.g., a time sufficient to expose the transistors of flip-flop 210 to BTI and thus allow the BTI to shift their threshold voltages, e.g., shift the threshold voltages of the transistors in each transistor pair in a direction that increases their difference. This process may be referred to as BTI recovery. Shifting the threshold voltages in this manner may increase the stability and reproducibility of the power-up (PUF) value to be output from the first flip-flop 210.

Shifting the logical value out of the first flip-flop may be accomplished based on the reset signal 520. In one embodiment, this signal may serve as a clock or enable signal that shifts the power-up (PUF) value from the first flip-flop 210 to the XOR logic. Once output, the inverted PUF value is fed back into the data input of the first flip-flop, as previously explained. A predetermined edge (e.g., negative edge) of the reset signal 520 may effect the desired inversion of the state of this flip-flop in one embodiment.

In accordance with one or more of the aforementioned embodiments, securing the netlist of the chip from unauthorized access through reverse engineering or other hacking techniques is enhanced in a number of ways. For example, by integrating the PUF(s) into the internal logic of one or both of the tie cells, it cannot be determined which tie cell is active and which tie cell is inactive through reverse-engineering techniques. Also, the PUF(s) are based on the power-up value(s) of flip-flop(s) used in one or more of the tie cells, which values are not discoverable to anyone but the manufacturer. Also, one or both of the tie cells may operate based on static logic. This may reduce propagation delays and power consumption. Also, the tie cells may be distributed among the plurality (e.g., hundreds, thousands, or more) of gates on the chip, making identification of the tie cells much more difficult to locate. Also, each of the tie cells may be described in RTL and therefore no modification of the digital library is required. Moreover, the tie cells may use standard logic cells (e.g., flip-flops, multiplexers, etc.) and thus does not require special logic that may prove expensive.

The controllers, signal generators, scan logic, and other signal-generating and signal-processing features of the embodiments disclosed herein may be implemented in logic which, for example, may include hardware, software, or both. When implemented at least partially in hardware, the controllers, signal generators, scan logic, and other signal-generating and signal-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, signal generators, scan logic, and other signal-generating and signal-processing features of the embodiments disclosed herein may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A tie cell, comprising:
a first flip-flop including a physically unclonable function (PUF);
a second flip-flop configured to generate a PUF key value;
logic configured to combine a value of the PUF and the PUF key value to generate an output value having a constant logical value, wherein the PUF value is based on a power-up value stored in the first flip-flop, the power-up value generated as a result of physical and/or electrical characteristics produced from a manufacturing process, and wherein the output value is generated to tie digital logic to the constant logical value; and
a selector coupled to an input of the second flip-flop, wherein the selector is configured to select:
in a scan test capture mode, a first signal based on the PUF value output from the first flip-flop, the scan test capture mode providing notification of the PUF value, and
in a scan test mode, a second signal based on the PUF key value, the scan test mode determining existence of a fault in the tie cell.

2. The tie cell of claim 1, wherein the second flip-flop is to store the PUF value in the scan test capture mode.

3. The tie cell of claim 1, wherein the second flip-flop is to store and then shift the PUF key value to the logic in the scan test mode.

4. The tie cell of claim 1, wherein the logic includes XOR logic.

5. The tie cell of claim 4, wherein the PUF key value is:
equal to the PUF value when the constant logical value is zero, and
different from the PUF value when the constant logical value is one.

6. An integrated circuit, comprising:
a first tie cell configured to generate a first signal, the first tie cell including a first flip-flop including a first physically unclonable function (PUF),
a second flip-flop configured to generate a PUF key value, and
logic configured to combine a value of the first PUF and the PUF key value to generate an output value having a constant logical value, wherein the PUF value is based on a power-up value stored in the first flip-flop, the power-up value generated as a result of physical and/or electrical characteristics produced from a manufacturing process, and wherein the output value is generated to tie digital logic to the constant logical value;
a second tie cell configured to generate a second signal;
a controller configured to generate at least one control signal for one or both of the first tie cell and the second tie cell, wherein the second tie cell includes a second PUF different from the first PUF and wherein the first signal has a constant first logical value and the second signal has a constant second logical value different from the first logical value; and
a selector coupled to an input of the second flip-flop, wherein the selector is configured to select,
in a scan test capture mode, the PUF value output from the first flip-flop, the scan test capture mode providing notification of the PUF value, and
in a scan test mode, the PUF key value, the scan test mode determining existence of a fault in the tie cell.

7. The integrated circuit of claim 6, wherein the controller is configured to generate the at least one control signal to activate the first tie cell during a time when the second tie cell is inactive.

8. The integrated circuit of claim 6, wherein the second flip-flop is to store the PUF value in the scan test capture mode.

9. The integrated circuit of claim 6, wherein the second flip-flop is to store and then shift the PUF key value to the logic in the scan test mode.

10. The integrated circuit of claim 6, wherein the logic includes XOR logic.

11. The integrated circuit of claim 10, wherein the PUF key value is:
equal to the PUF value when the constant logical value is zero, and
different from the PUF value when the constant logical value is one.

12. A method for controlling an integrated circuit, comprising:
obtaining a value correspond to a physically unclonable function (PUF);

generating a PUF key value based on the PUF value;
logically combining the PUF value and the PUF key value to generate an output signal having a constant logical value, wherein the PUF value is based on a power-up value stored in a first flip-flop in a tie cell, the power-up value generated as a result of physical and/or electrical characteristics produced from a manufacturing process, and wherein the output value is generated to tie digital logic to the constant logical value;
selecting a signal for input into a second flip-flop in the tie cell, wherein the second flip-flop is configured to generate a PUF key value, wherein the signal is based on the PUF value output from the first flop-flop in a scan test capture mode, and the signal is based on the PUF key value in a scan test mode, and wherein the scan test capture mode providing notification of the PUF value and the scan test mode determining existence of a fault in the tie cell.

13. The method of claim 12, wherein the PUF value and the PUF key value are logically combined by XOR logic.

14. The method of claim 13, wherein the PUF key value is
  equal to the PUF value when the constant logical value is zero, and
  different from the PUF value when the constant logical value is one.

* * * * *